US011978425B1

(12) United States Patent
Krzewski et al.

(10) Patent No.: US 11,978,425 B1
(45) Date of Patent: May 7, 2024

(54) PERCUSSION INSTRUMENT AND METHOD OF MANUFACTURING THE SAME

(71) Applicants: James Gordon Krzewski, Jenison, MI (US); Donald Bryan DeCorte, Hudsonville, MI (US)

(72) Inventors: James Gordon Krzewski, Jenison, MI (US); Donald Bryan DeCorte, Hudsonville, MI (US)

(73) Assignee: James Gordon Krzewski, Jenison, MI (US)

( * ) Notice: Subject to any disclaimer, the term of this patent is extended or adjusted under 35 U.S.C. 154(b) by 0 days.

(21) Appl. No.: 18/450,166

(22) Filed: Aug. 15, 2023

(51) Int. Cl.
*G10D 13/06* (2020.01)
*G10D 13/24* (2020.01)

(52) U.S. Cl.
CPC ............ *G10D 13/06* (2013.01); *G10D 13/24* (2020.02)

(58) Field of Classification Search
CPC .............................. G10D 13/06; G10D 13/24
See application file for complete search history.

(56) References Cited

U.S. PATENT DOCUMENTS 3,475,582 A * 10/1969 Cox .................... B23K 11/312 219/119
2014/0069255 A1* 3/2014 Kolchinsky ............. G10K 3/00 84/402

OTHER PUBLICATIONS

Amazon Musical Spoons Percussion Pro Instrument, Spoon Man Inc, citing spot welded metal spoons, cited as date first available Feb. 2, 2021. https://www.amazon.com/Musical-Spoons-Percussion-Pro-Instrument/dp/B08VPZXY4X. (Year: 2021).*

* cited by examiner

*Primary Examiner* — Robert W Horn

(57) ABSTRACT

A spoon instrument and a method of manufacturing the same is provided. Two spoons are joined together near their handle's distal end by temporarily aligning and fixing this aligned arrangement by way of an alignment fixture. The alignment fixture provides spaced apart, parallelly arranged plates that define an ideal joint location between the two spoons formed by spot welding, as opposed to welding using consumable or filler material.

8 Claims, 3 Drawing Sheets

PERCUSSION INSTRUMENT AND METHOD OF MANUFACTURING THE SAME

BACKGROUND OF THE INVENTION

The present invention relates to percussion instruments and, more particularly, to spoon percussion instruments and methods of manufacturing the same.

Spoons can be played as a makeshift percussion instrument that creates sound primarily by the vibration of the instrument itself. Using two utensil spoons to "spoon" involves a musician tightly holding the pair of utensil spoons together, with concave sides facing out, so they do not slide apart, with index finger between their handles to space them apart. When the pair is struck, the spoons sharply hit each other and then spring back to their original position. The spoons are typically struck against the knee and the palm of the hand. The fingers and other body parts may also be used as striking surfaces to produce different sounds, rhythms, rattles, and visual effects.

Current musical spoons are two spoons mechanically fastened (e.g., rivetted) together or made from thin metals that are metal inert gas (MI), tungsten inert gas (TIG) welded, or soldered together. These manufacturing/joining methods add cost, additional cleaning requirements, post polishing, and are not strong or durable enough to avoid distorted vibrational/aesthetic sound quality issues. These joining methods also tend to deteriorate relatively quickly, thereby offering a musical instrument with a very short life span of satisfactory sound quality. Furthermore, since optics can play an important role in an overall spoon performance, the prior art's use of flimsy metal's (to enable MIG welding, TIG welding, or soldering) do not look very good once welded.

As can be seen, there is a need for a spoon percussion instrument and methods of manufacturing the same that includes a novel alignment fixture and spot-welding steps.

SUMMARY OF THE INVENTION

The present invention includes an alignment fixture dimensioned and adapted to hold the pair of spoons in a perfect fit so that the spot weld is ideally located and stronger than the other welded or mechanically fastened musical spoons of the prior art.

The present invention embodies a method of aligning and fixturing of a pair of spoons that reduces overall cost, greatly improves life of the resulting spoon instrument due to increased strength while not negatively distorting sound quality nor causing negative aesthetic issues.

The method of manufacture includes metal spoons that are alignment-fixtured and then resistance spot welded together with no additional material, thereby making them stronger and more durable than anything currently in the marketplace.

In one aspect of the present invention, a method of making a spoon instrument includes joining two spoons by spot welding at a joint location of handles of the two spoons.

The another aspect of the present invention the method further includes, prior to spot welding, aligning the joint location with two spot-welding electrodes by way of an alignment fixture, and prior to aligning the joint location, sliding the handles of the two spoons between two plates of the alignment fixture, wherein the two plates provide access to the two spot-welding electrodes, respectively, at an orientation transverse to a sliding direction of the handles of the two spoons, wherein the orientation transverse is approximately orthogonal relative to the sliding direction, wherein spacing of the two plates defines the joint location along the handles of the two spoons, wherein no consumables nor filler weld material is used during the spot welding, wherein the handles of two spoons are made of metal, wherein the metal is stainless steel.

In yet another aspect of the present invention, a spoon musical instrument comprising a spot weld at a joint location of two spoons of the spoon musical instrument, wherein the spot welding involved no consumable nor filler weld material.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Figure 1:
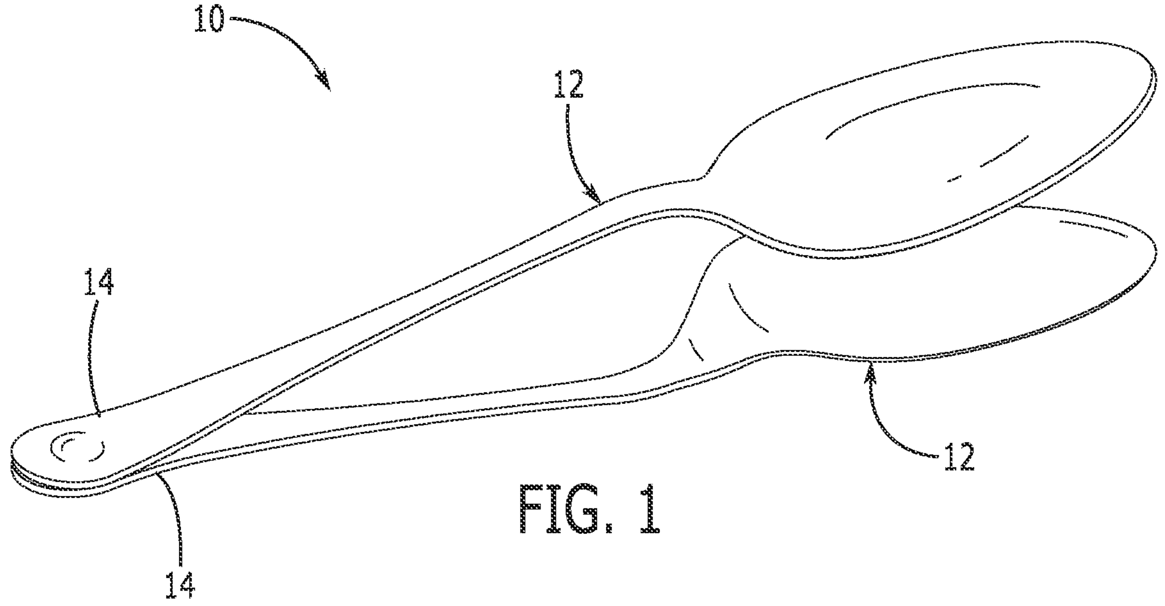
FIG. 1 is a perspective view of an exemplary embodiment of the present invention.
Figure 2:
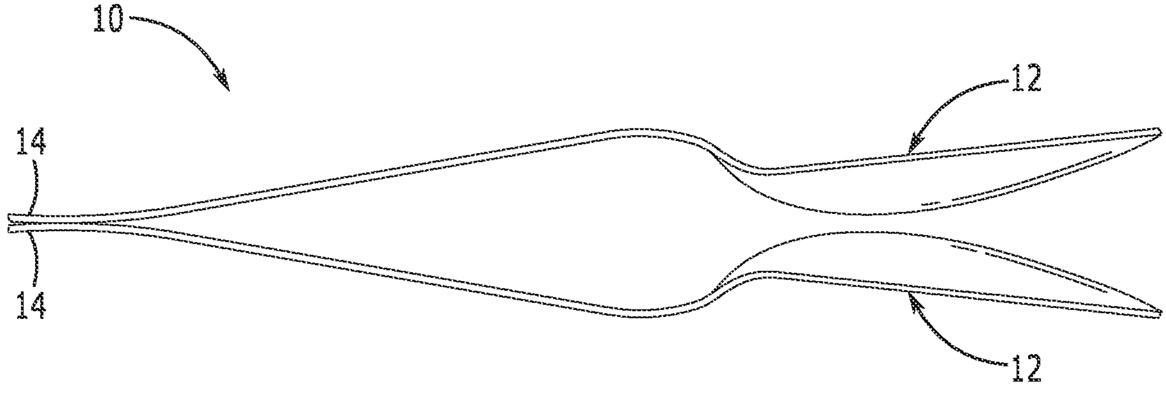
FIG. 2 is a side elevation view of an exemplary embodiment of the present invention.
Figure 3:
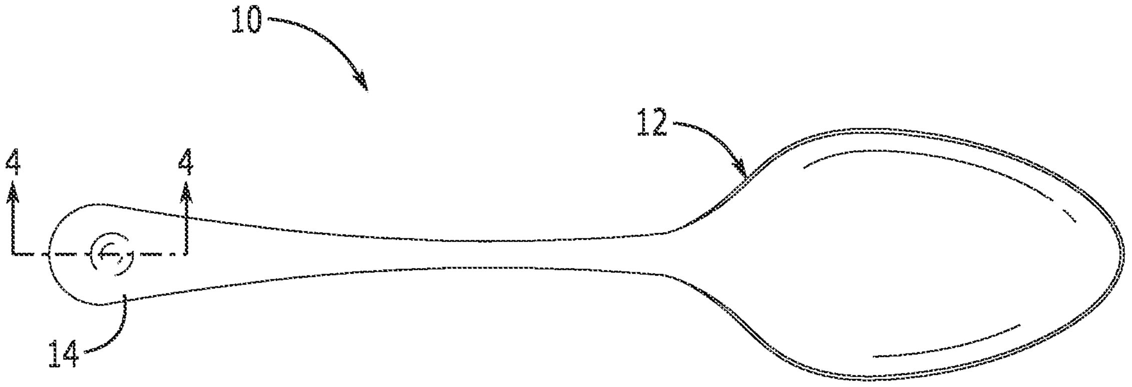
FIG. 3 is a top plan view of an exemplary embodiment of the present invention.
Figure 4:
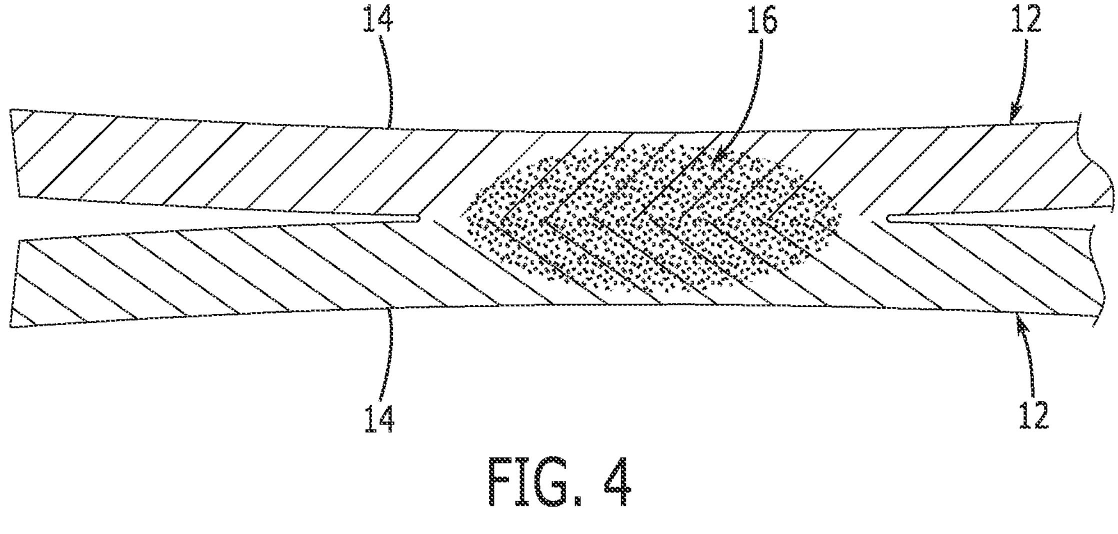
FIG. 4 is a detailed section view of an exemplary embodiment of the present invention.
Figure 5:
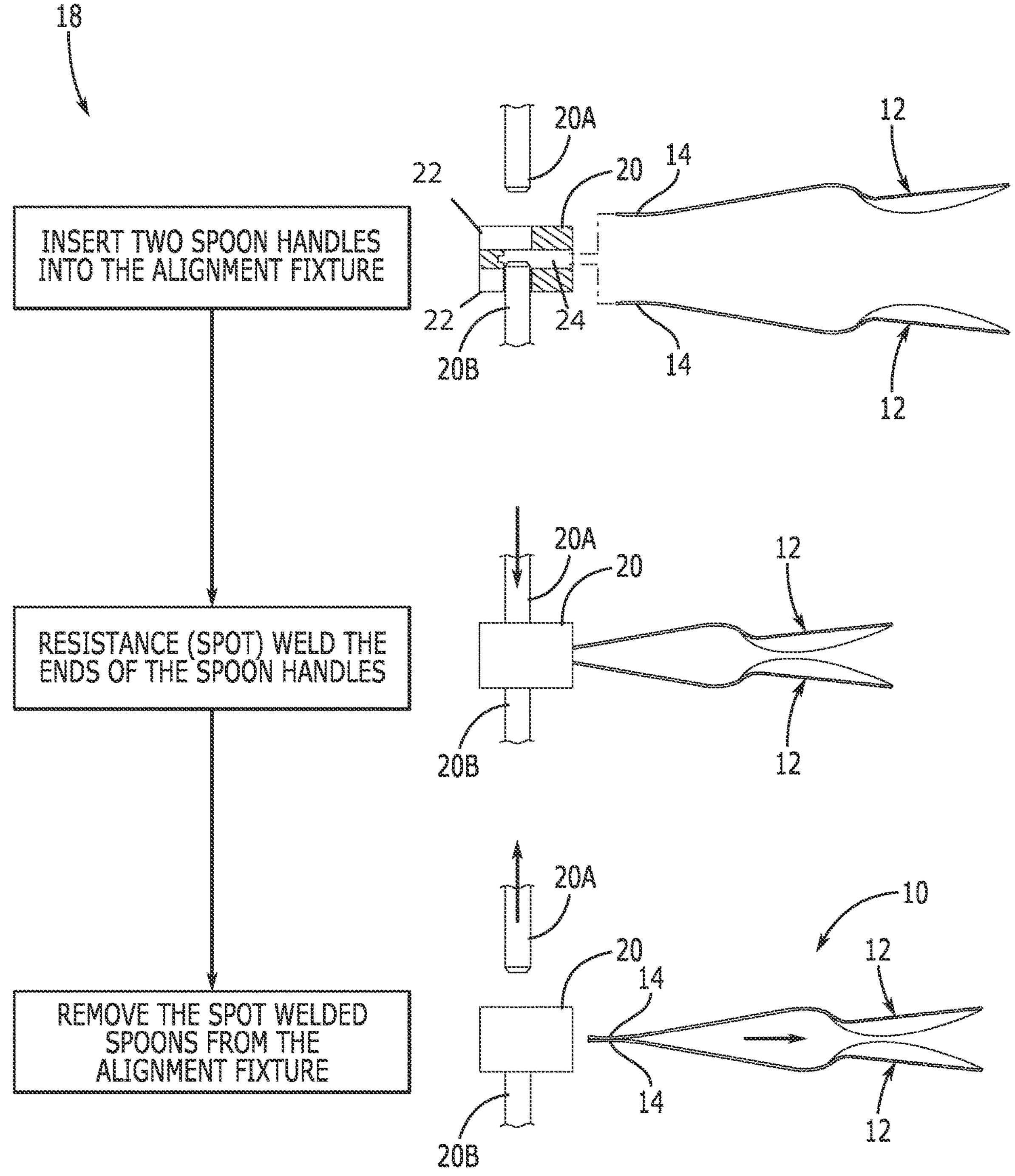
FIG. 5 is a schematic flow chart 18 of an exemplary embodiment of the present invention.

Referring to FIGS. 1 through 5, the present invention may include a spoon instrument 10 comprising the inventive joining of two metal spoons 12 by way of aligning and spot-welding their handles 14. The resulting joint location 16 may include a weld nugget formed through a resistance spot welding process aided by an alignment fixture 20.

Spot welding (or resistance spot welding) is a type of electric resistance welding used to weld various sheet metal products, through a process in which contacting metal surface points are joined by the heat obtained from resistance to electric current. Spot welding is typically used when welding types of sheet metal, welded wire mesh or wire mesh. Regarding welding the two metal spoons 14, spot welding is superior and critically different than MIG welding, TIG welding, and soldering, which require a consumable or filler material. This critically lies, in part, because the thickness of the spoons 12 should not exceed ten millimeters because excessive thickness negatively impacts the vibrational/acoustic properties of the resulting spoon instrument 10. Many types of metals may employ the inventive process, which stainless steel be a good candidate.

The fabrication process contemplated by the present invention may include a first spoon 12 placed in a mirror-image arrangement relative to a second spoon 12 with their concave sides facing out and their respective handles 14 engaging at a joint location 16. Note, this joint location 16 may be inward or at the distal end of the handles 14. Joint location 16 needs to be inserted into the alignment fixture 20.

The alignment fixture 20 may include two plates 22 securing in a parallel, spaced apart arrangement with each other, thereby defining a gap 24 therebetween, into which the distal ends of the handles 14 and the joint location 16 may be slidably received. In some embodiments, the two handles 14 may be slid into the gap 24 until the spacing of the plate 22 resists further entry, thereby determining the joint location 16 through the initial selection or setting of the gap of the alignment fixture plates 22.

Each plate 22 may provide access to electrodes 20A and 20B, respectively, so that when the joint location 16 is circumscribed by plates 22 the electrode 20A and 20B can produce a spot weld at the joint location 16. The electrode access is oriented transverse relative to the slidable entry of the handles 14. Once the controlled predetermine weld nugget is formed there is no post cleaning or polishing required.

After welding, the rear surfaces of the convex portion of the spoons are spaced at approximately four millimeters (4 mm) so that when a musician taps down on the spoons the backs hit together making a percussive sound. The spacing apart of the alignment fixture plates 22 may be defined to result in this post-welding approximate 4 mm spacing. Drilling or clamping is not required before welding. Critically, no filler metal or added rivet is needed.

The inventive process results in a lower cost product that needs little or no tuning and a more aesthetically pleasing, visually and sonically, spoon instrument 10 compared to the prior art. Furthermore, the musician's fingers are no longer needed to spread the two backs of the spoons apart, and so the musical spoons 10 tend not to slide around in the musician's hand as a result, making them easier to play.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of making a spoon instrument, the method comprising:

joining two spoons by spot welding at a joint location of handles of the two spoons; and prior to spot welding, aligning the joint location with two spot-welding electrodes by way of an alignment fixture.

2. The method of claim 1, further comprising, prior to aligning the joint location, sliding the handles of the two spoons between two plates of the alignment fixture.

3. The method of claim 2, wherein the two plates provide access to the two spot-welding electrodes, respectively, at an orientation transverse to a sliding direction of the handles of the two spoons.

4. The method of claim 3, wherein the orientation transverse is approximately orthogonal relative to the sliding direction.

5. The method of claim 4, wherein spacing of the two plates defines the joint location along the handles of the two spoons.

6. The method of claim 5, wherein no consumables nor filler weld material is used during the spot welding.

7. The method of claim 6, wherein the handles of two spoons are made of metal.

8. The method of claim 7, wherein the metal is stainless steel.

* * * * *